US009790110B2

(12) United States Patent
Church et al.

(10) Patent No.: US 9,790,110 B2
(45) Date of Patent: Oct. 17, 2017

(54) PROCESSES AND TREATMENT SYSTEMS FOR TREATING HIGH PHOSPHOROUS CONTAINING FLUIDS

(71) Applicants: The United States of America, as represented by the Secretary of Agriculture, Washington, DC (US); Pennsylvania State University, University Park, PA (US)

(72) Inventors: Clinton Church, Julian, PA (US); Ray B. Bryant, Spring Mills, PA (US); Peter J. Kleinman, Warriors Mark, PA (US); Alex Hristov, State College, PA (US)

(73) Assignees: The United States of America, as Represented by the Sectary of Agriculture, Washington, DC (US); The Penn State Research Foundation, University Park, PA (US)

(*) Notice: Subject to any disclaimer, the term of this patent is extended or adjusted under 35 U.S.C. 154(b) by 0 days.

(21) Appl. No.: 14/665,229
(22) Filed: Mar. 23, 2015
(65) Prior Publication Data

US 2015/0274556 A1    Oct. 1, 2015

Related U.S. Application Data

(60) Provisional application No. 61/969,998, filed on Mar. 25, 2014.

(51) Int. Cl.
*C02F 1/52* (2006.01)
*C02F 1/28* (2006.01)
(Continued)

(52) U.S. Cl.
CPC ............ *C02F 1/5245* (2013.01); *B01J 20/02* (2013.01); *B01J 20/0225* (2013.01);
(Continued)

(58) Field of Classification Search
CPC .......... C02F 1/281; C02F 1/52; C02F 1/5236; C02F 1/5245; C02F 1/56; C02F 2201/008;
(Continued)

(56) References Cited

U.S. PATENT DOCUMENTS 5,593,473 A * 1/1997 Marchese ................ C05F 3/00
                                                    71/15
6,245,121 B1 * 6/2001 Lamy ...................... B01D 61/04
                                                    210/600
(Continued)

OTHER PUBLICATIONS

Meers, E., et al. "Physico-chemical P removal from the liquid fraction of pig manure as an intermediary step in manure processing," Water, Air, and Soil Pollution, 169: 317-330 (2006).*
(Continued)

*Primary Examiner* — Katherine Zalasky
*Assistant Examiner* — Benjamin Lebron
(74) *Attorney, Agent, or Firm* — John D. Fado; G. Byron Stover

(57) ABSTRACT

Disclosed herein are processes for treating high-P fluid involving (1) providing a high-P containing stream; (2) chemically treating the high-P stream such that a majority of dissolved P in the stream is transformed into a solid form via sorption of P onto particles placed or precipitated within the stream; and (3) removing the solid form containing P from the chemically treated fine solids stream, such that >about 90% of the total P is removed from the high-P fluid. Also disclosed are systems for treating a high-P stream, the systems involving (1) a chemical treatment station operable to chemically treat and transform equal to or greater than about 90% of dissolved P in a high-P stream into a solid form; and (2) a liquid-solid separator station operable to remove the solid form containing P from the chemically treated high-P stream.

20 Claims, 9 Drawing Sheets
(1 of 9 Drawing Sheet(s) Filed in Color)

(51) Int. Cl.
*C02F 11/12* (2006.01)
*C02F 11/14* (2006.01)
*B01J 20/02* (2006.01)
*B01J 20/04* (2006.01)
*B01J 20/08* (2006.01)
*C02F 1/44* (2006.01)
*C02F 101/10* (2006.01)
*C02F 103/20* (2006.01)
*C02F 1/56* (2006.01)

(52) U.S. Cl.
CPC ....... *B01J 20/0229* (2013.01); *B01J 20/0248* (2013.01); *B01J 20/041* (2013.01); *B01J 20/045* (2013.01); *B01J 20/046* (2013.01); *B01J 20/08* (2013.01); *C02F 1/281* (2013.01); *C02F 1/52* (2013.01); *C02F 1/5236* (2013.01); *C02F 11/121* (2013.01); *C02F 11/125* (2013.01); *C02F 11/14* (2013.01); *C02F 1/44* (2013.01); *C02F 1/56* (2013.01); *C02F 11/127* (2013.01); *C02F 2101/105* (2013.01); *C02F 2103/20* (2013.01); *C02F 2201/008* (2013.01)

(58) Field of Classification Search
CPC ...... C02F 11/127; C02F 2103/20; C02F 1/44; C02F 11/125; C02F 11/14; C02F 11/121; B01J 20/20; B01J 20/0281; B01J 20/02; B01J 20/08; B01J 20/3204; B01J 20/3236; B01J 20/3433; B01J 20/041; B01J 20/043; B01J 20/06; B01J 20/10; B01J 20/0225; B01J 20/0229; B01J 20/0248; B01J 20/045; B01J 20/046
See application file for complete search history.

(56) References Cited

U.S. PATENT DOCUMENTS

| | | | |
|---|---|---|---|
| 6,893,567 B1* | 5/2005 | Vanotti | C02F 1/5245 210/220 |
| 7,972,517 B1* | 7/2011 | Miller | C02F 11/14 210/710 |
| 2006/0032807 A1* | 2/2006 | Sansalone | B01D 15/00 210/263 |
| 2009/0065448 A1* | 3/2009 | Schedler | C02F 11/125 210/770 |
| 2012/0118035 A1* | 5/2012 | Zhao | C05F 5/008 71/32 |

OTHER PUBLICATIONS

Sibrell, P., et al. "Removal of phosphorous from agricultural wastewaters using adsorption media prepared from acid mine drainage sludge," Water Research, 43: 2240-2250 (2009).*

* cited by examiner

PROCESSES AND TREATMENT SYSTEMS FOR TREATING HIGH PHOSPHOROUS CONTAINING FLUIDS

REFERENCE TO RELATED APPLICATION

This application claims the benefit of U.S. Provisional Application No. 61/969,998, filed 25 Mar. 25, 2014, which is incorporated herein by reference in its entirety.

STATEMENT REGARDING FEDERALLY SPONSORED RESEARCH OR DEVELOPMENT

This invention was made with government support under Hatch Act Project Nos. PEN04224 and PEN04539, awarded by the United States Department of Agriculture (USDA). The Government has certain rights in the invention.

BACKGROUND OF THE INVENTION

Disclosed herein are processes for treating high-P fluids involving (1) providing a high-P containing stream; (2) chemically treating the high-P stream such that a majority of dissolved P in the stream is transformed into a solid form via sorption of P onto particles placed or precipitated within the stream; and (3) removing the solid form containing P from the chemically treated fine solids stream, such that >about 90% of the total P is removed from the high-P fluid. Also disclosed are systems for treating a high-P stream, the systems involving (1) a chemical treatment station operable to chemically treat and transform equal to or greater than about 90% of dissolved P in a high-P stream into a solid form; and (2) a liquid-solid separator station operable to remove the solid form containing P from the chemically treated high-P stream.

Managing manure phosphorus (P) has become a priority concern of livestock operations, in part due to nutrient management implications with land application of manure. Concentrated livestock production occurs in many regions of the country and is associated with regional and farm-scale accumulations of P due to the nature of feed nutrients and metabolism by the animal, with manure P typically containing more than two-thirds of consumed feed P (Hristov, A. N., et al., J. Dairy Sci., 89: 3702-3712 (2006)). These accumulations have, over time, created a legacy of P sources that can enrich runoff water and contribute to downstream eutrophication, the most pervasive water quality problem in the US, which accounts for about 66% of the impaired conditions of US rivers (Carpenter, S., et al., Ecol. Appl., 8: 559-568 (1998)). Compounding the legacy effect of regional and farm P accumulations is the imperfect ratio of N and P in most livestock manures when used as a fertilizer source. Elevated concentrations of P in manure relative to N results in excess application of P to agricultural soils when manures are applied to meet crop N demand (Sharpley, A. N., et al., J. Env. Qual., 23: 437-451 (1994)). Few options are available to efficiently move manure P from areas of surfeit to areas of deficit and few options exist to adjust manure nutrient ratios to better fit crop demand (Sharpley et al. 1994; Kleinman, P., et al., J. Soil and Water Conserv., 67: 54A-61A (2012)).

A variety of approaches have been proposed to treat animal manures to reduce their potential for adverse environmental impact. Most successful has been the use of aluminum (Al), iron (Fe) and calcium (Ca) salts as manure amendments to reduce the solubility of P, thereby decreasing the potential of manure to enrich dissolved P in runoff water (Moore, P. A., Jr., and D. M. Miller, J. Env. Qual., 23: 325-330 (1994); Smith, D. R., et al., J. Env. Qual., 33: 1048-1054 (2004); Irshad, M., et al., Can. J. of Soil Sci., 92: 893-900 (2012)). Indeed, the application of alum ($Al_2(SO_4)_3$) to poultry litter has also been shown to improve the conservation of $NH_4$—N in manure due to the weak acidic properties of alum (Moore, P. A., Jr., et al., J. Env. Qual., 29: 37-49 (2000)). However, amending manures to reduce manure P solubility does not change the N:P ratio in manures and does not address the accumulation of P on farms. To achieve that objective, removal of P is necessary while conserving sufficient N to create an N:P ratio more favorable to crop production.

We have developed systems and processes for economically treating animal manure and other by-products that can be applied to land to reduce their phosphorus content. In addition, the systems can be compact and mobile.

SUMMARY OF THE INVENTION

Streams of organic by-products and manure slurries containing relatively high and/or undesired amounts of phosphorus are known; for example, animal manure contains nutrients, including nitrogen (N), phosphorus (P), and organic materials that are beneficial to crops when they are applied to land. However, the concentration of such nutrients is too low to make transportation of bulk manures and other by-products economically viable over large distances. In addition, since large quantities of available manure, such as dairy manure and swine manure, are typically in slurry form, and thus must be transported in tanks, they are inconvenient to be hauled as well. For such reasons, manures and liquid organic byproducts tend to be applied to soils near the locations/farms where they are generated.

It is appreciated that P is a conservative element relative to N in such manures and liquid organic byproducts, and that the N:P ratio is low with respect to crop needs. As such, P concentrations in soils where these fluids are applied are often in excess of crop demands. In addition, due to increasing problems with eutrophication of streams and other bodies of water, farmers have experienced increasing pressure to not apply animal manures to fields that are already high in P content. Therefore, a system and process for economically treating animal manure and other by-products that can be applied to land to reduce their phosphorus content would be desirable.

Disclosed herein are processes for treating high-P fluid involving (1) providing a high-P containing stream; (2) chemically treating the high-P stream such that a majority of dissolved P in the stream is transformed into a solid form via sorption of P onto particles placed or precipitated within the stream; and (3) removing the solid form containing P from the chemically treated fine solids stream, such that >about 90% of the total P is removed from the high-P fluid. Also disclosed are systems for treating a high-P stream, the systems involving (1) a chemical treatment station operable to chemically treat and transform equal to or greater than about 90% of dissolved P in a high-P stream into a solid form; and (2) a liquid-solid separator station operable to remove the solid form containing P from the chemically treated high-P stream.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
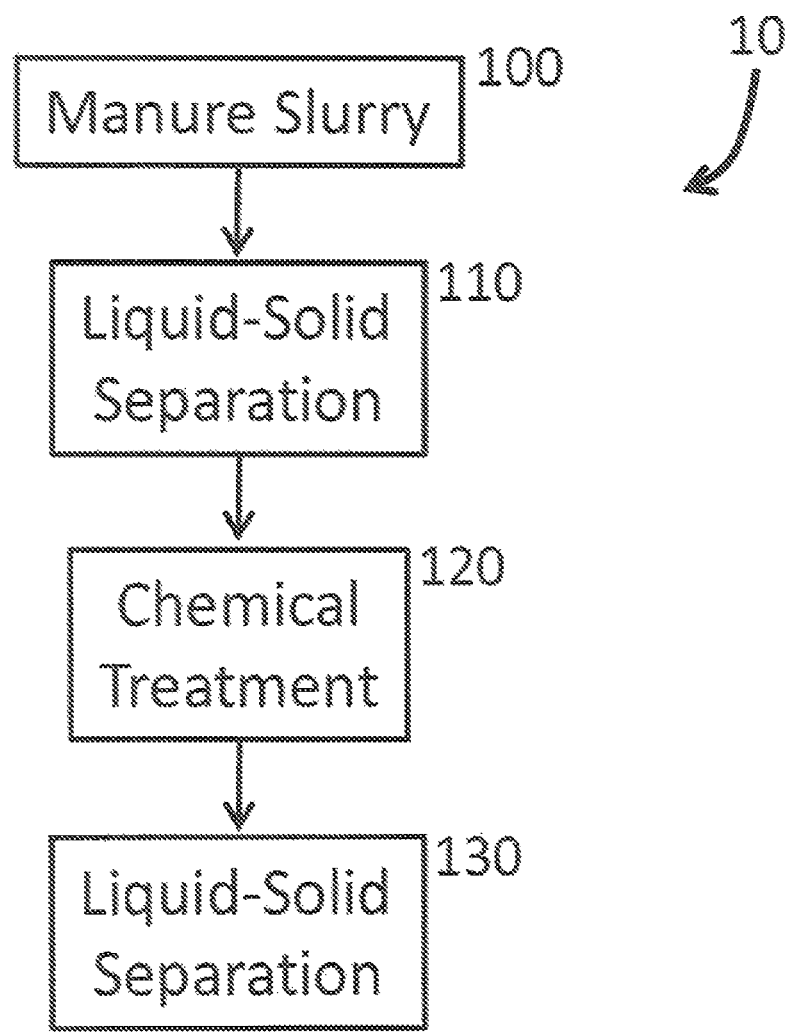
FIG. 1 shows one embodiment of the system and/or process for treating a slurry as described below.

Disclosed herein are processes for treating high-P fluids involving (1) providing a high-P containing stream; (2) chemically treating the high-P stream such that a majority of dissolved P in the stream is transformed into a solid form via sorption of P onto particles placed or precipitated within the stream; and (3) removing the solid form containing P from the chemically treated fine solids stream, such that >about 90% of the total P is removed from the high-P fluid. Also disclosed are systems for treating a high-P stream, the systems involving (1) a chemical treatment station operable to chemically treat and transform equal to or greater than about 90% of dissolved P in a high-P stream into a solid form; and (2) a liquid-solid separator station operable to remove the solid form containing P from the chemically treated high-P stream.

Herein we provide systems and processes for treating a fluid having a P content that is above a desired predetermined level (hereafter referred to as high-P fluid, stream slurry, etc.). One of the major advantages of our systems over what is currently available is the ability to be made into a mobile system, and to do the processes more simply. No large pH changes are needed, no need to first remove the N (which fights the pH change and makes the known systems uneconomical), and no need for a large-scale bioreactor. Therefore the entire system can be small and mobile. An added advantage is that the N stays behind in the treated liquid for the beneficial use of the farmer to fertilize crops.

The term "fluid" is defined as including pure liquid (i.e., a liquid without any solids present) and a liquid containing solids (e.g., a slurry); generally a slurry is treated (generally the fewer the solids, the better the systems will work). The high-P fluid may, for example, contain animal manure (e.g., dairy manure, swine manure, chicken manure with added water mixed to form a slurry), or acid whey from a yogurt manufacturing facility. The systems and/or processes can include a first liquid-solid separation step (optional), a chemical treatment step, and a second liquid-solid separation step. In some instances, a slurry is pumped through the system where particulates and/or P are removed at each of the steps.

In the optional first liquid-solid separation step, solids equal to or greater than about 30 micrometers (e.g., equal to or greater than 30 µm), and in some instances equal to or greater than about 25 µm (e.g., equal to or greater than 25 µm), in diameter are removed (if needed due to the nature of the fluid) from a slurry and a resultant fine solids stream is produced. The fine solids stream is chemically treated such that a majority (e.g, equal to or greater than about 90% (e.g., equal to or greater than 90%; preferably equal to or greater than about 95% (e.g., equal to or greater than 95%)) of dissolved P in the stream is transformed via sorption into a solid form. Thereafter, the solid form containing the P and any additional fine solids equal to or greater than about 1 µm (e.g., equal to or greater than 1 µm) are removed from the chemically treated fine solids stream. The first step is optional, depending upon the nature of the fluids you are treating. It is necessary to have the solids in the fluid to be smaller than 25 µm when they are chemically treated. So in the case of raw manure the first liquid-solid separation step is necessary. However, in the case of acid whey, or in some manure effluents where solids have been settled, for example, in a lagoon, the first liquid-solid separation step is not needed because particles larger than 25 µm are not in the fluid to be treated.

The removal of the solids equal to or greater than about 30 µm (e.g., equal to or greater than 30 µm) in diameter can include removal of bulk solids ((e.g., solids having a particle size equal to or greater than about 5 mm (e.g., equal to or greater than 5 mm)), and removal of medium size particles/solids having a particle size equal to or greater than about 30 µm (e.g., equal to or greater than 30 µm), for example using a centrifuge. The bulk solids may or may not be removed using an auger press, screw press, and the like, and the bulk solids may or may not be composted for future use. In addition, the bulk solids can be blended with the fine solids in order to produce an easily transportable fertilizer. For farms that use composted manures as bedding for cows, these bulk solids are a low-P beneficial use product that can be left on the farm while the higher-P finer solids are removed by the centrifuge. In fact, that is why one could use two machines for the initial liquid-solid separation, instead of just using a larger capacity centrifuge, which could remove both bulk and intermediate solids.

The fine solids stream is chemically treated with a chemical, substance, etc., that sorbs out P that is dissolved in the fine solids stream. For example and for illustrative purposes only, the fine solids stream can be chemically treated with iron sulfate, iron chloride, iron oxyhydroxide, aluminum sulfate, aluminum chlorhydrate, calcium oxide or hydroxide (lime) and the like, such that P ions precipitate or sorb onto particles and precipitates, etc., within the fine solids stream. In addition, the fine solids stream can be chemically treated using a batch process, or in the alternative using a continuous process. One generally would want to avoid aluminum because of possible toxicity issues if the resulting solids were subjected to a lowering of pH, and the problem with calcium is that it has to rely on a pH adjustment above 10.5 to work and that is likely to be too expensive because of the buffering capacity of the manure feed itself, as well as the problems with ammonium turning into ammonia (the reasons known systems remove N biologically first which keeps those systems from being mobile). Finally, chemically treating the fine solids stream can include coagulating the fine solids, for example by adding a polymer coagulant (e.g., various polyacrylamides often abbreviated as PAM) to the fine solids stream. For the manure and the manure liquor treated below the polymer used was anionic (Praestol® 2504 from Ashland Deutschland GmbH, Krefeld, Germany). For the acid whey treated below the polymer used was cationic (Praestol® K290FLX from Demols Inc., Houston, Tex.).

A system for treating a high-P fluid, slurry, stream, etc., can include an optional first liquid-solid separator station that is operable to remove solids having a particle size equal to or greater than about 30 μm (e.g., equal to or greater than 30 μm) and produce a fine solids stream. The system also includes a chemical treatment station that is operable to chemically treat and transform the majority (e.g., equal to or greater than about 90%, preferably equal to or greater than about 95%) of dissolved P in the fine solids stream into a solid P form. Also, the system can have a second liquid-solid separator station that is operable to remove the solid P form and any other fine solids equal to or greater than about 1 μm (e.g., equal to or greater than 1 μm) from the chemically treated fine solids stream. The first liquid-solid separator station can include an auger press and/or a centrifuge and the second liquid-solid separator station can include a filtration unit.

In addition to the above, the processes and/or systems described herein differ from U.S. Pat. Nos. 6,893,567 and 7,674,379 in that the prior art requires the removal of N first to allow a pH change to about 10.5 (e.g., 10.5) using lime which induces the precipitation of calcium phosphate, whereas the processes and/or systems described herein do not require (and generally do not include) the removal of N as a first step since it is not pH driven and can operate in a range of pH values from about 2 to about 12 (e.g., 2 to 12, circumneutral pH preferred)). As such, the processes and/or systems described herein allow for dissolved N to be carried through the system in the liquids and thereby be left as a beneficial use as a liquid fertilizer for crops. In other words, the prior art cited has to remove N first (they do it biologically) to allow the pH change. Without removing the N, their system would not be cost effective. With removing the N the way they do, their system would be far too large to be a mobile unit because it uses a large bioreactor. In contrast, our system can be compact and mobile. Our system also leaves the N behind in the final liquid phase which is of beneficial use for the farmer.

With reference to FIG. 1, a process for treating a slurry in the form of animal manure is shown generally at reference numeral 10. The process 10 includes providing a manure slurry at step 100 and performing a liquid-solid separation step at 110. Thereafter, the remaining manure slurry is chemically treated at step 120 and then subjected to an additional liquid-solid separation step at 130. It is appreciated that the chemically treated step 120 includes sorption of dissolved P in the slurry onto particles, precipitates, etc.

Figure 2:
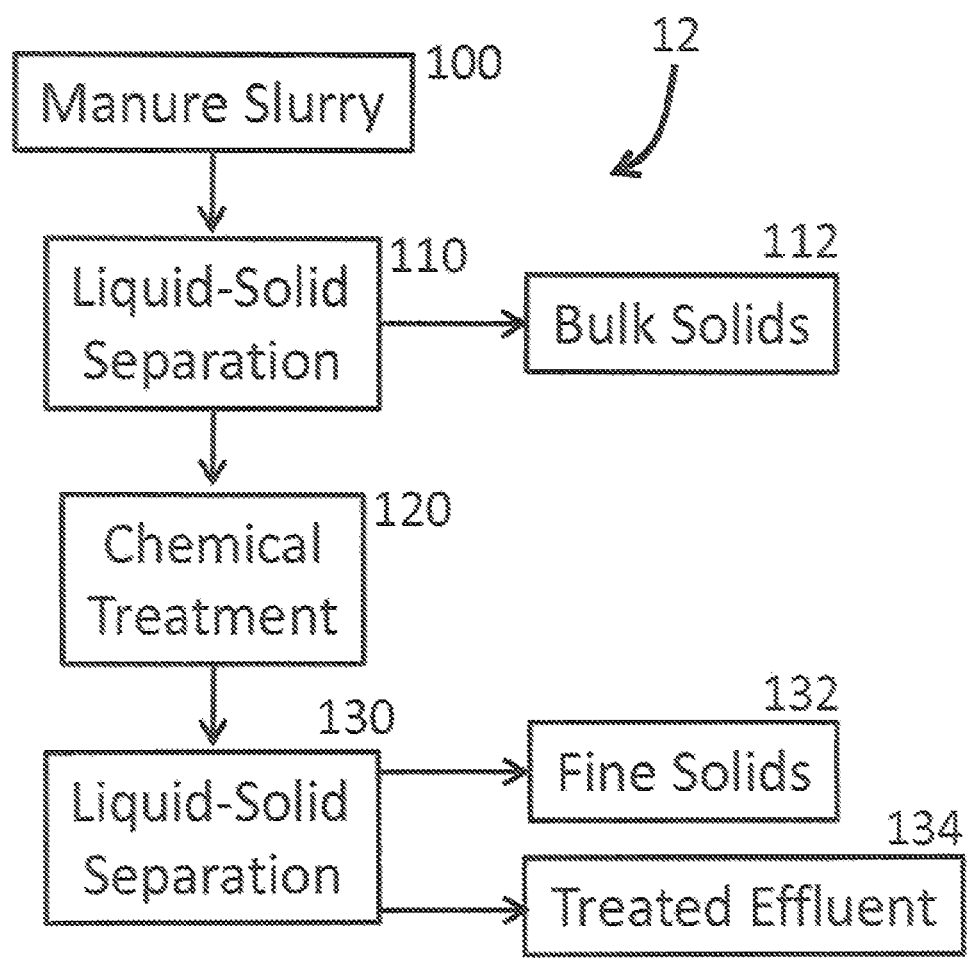
FIG. 2 shows another embodiment of the system and/or process for treating a slurry as described below.

Another embodiment of the process is shown generally at reference numeral 12 in FIG. 2 in which the manure slurry provided at step 100 is subjected to a liquid-solid separation step at 110 in which bulk solids 112 are removed. Thereafter, the remaining manure slurry is subjected to the chemical treatment step at 120 and the liquid-solid separation step at 130 where fine solids are provided at 132 and treated effluent is provided at 134.

Figure 3:
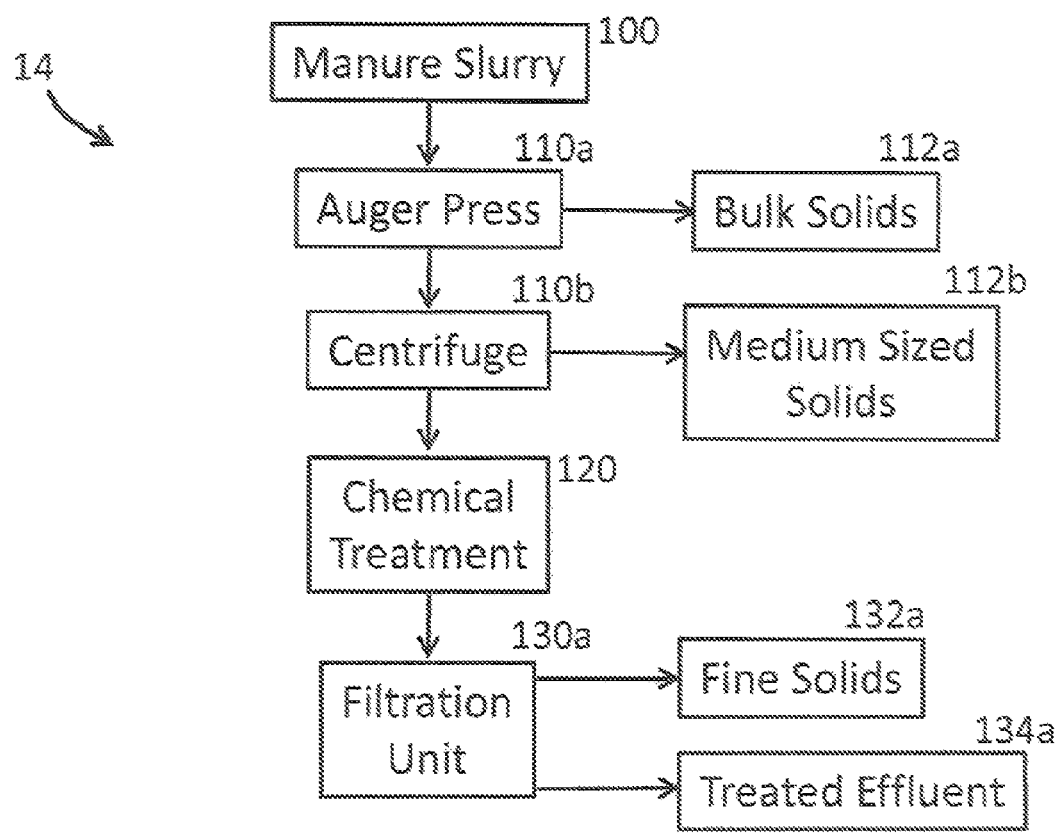
FIG. 3 shows another embodiment of the system and/or process for treating a slurry as described below.

In some instances, the process includes the use of an auger press, centrifuge, and filtration unit as illustrated in FIG. 3. In particular, a process 14 includes passing the manure slurry 100 through an auger press at 110a from which bulk solids are removed and provided at 112a. Thereafter, the remaining manure slurry is passed through a centrifuge at step 110b where medium sized solids are removed and provided at step 112b. The medium sized solids can include particles that have a diameter equal to or greater than about 30 μm (e.g., equal to or greater than 30 μm). The remaining manure slurry is subjected to the chemical treatment step at 120 where a majority (e.g., equal to or greater than about 90%, preferably equal to or greater than about 95%) of the dissolved P is transformed into a solid form. Finally, the chemically treated manure slurry is passed through a filtration unit at step 130a, the filtration unit removing fine solids that include the solid P at step 132a. Also, treated effluent is provided at step 134a.

The fine solids may or may not have particle diameters in the range of about 1 to about 30 micrometers (e.g., 1 to 30 micrometers), or in the alternative between about 0.5 and about 25 micrometers (e.g., 0.5 to 25 micrometers). Finally, the fine solids can be dried or produced in a dried state such that the P-rich material can be mixed or blended with the bulk solids and/or medium sized solids in order to produce an easily transportable fertilizer.

Figure 4:
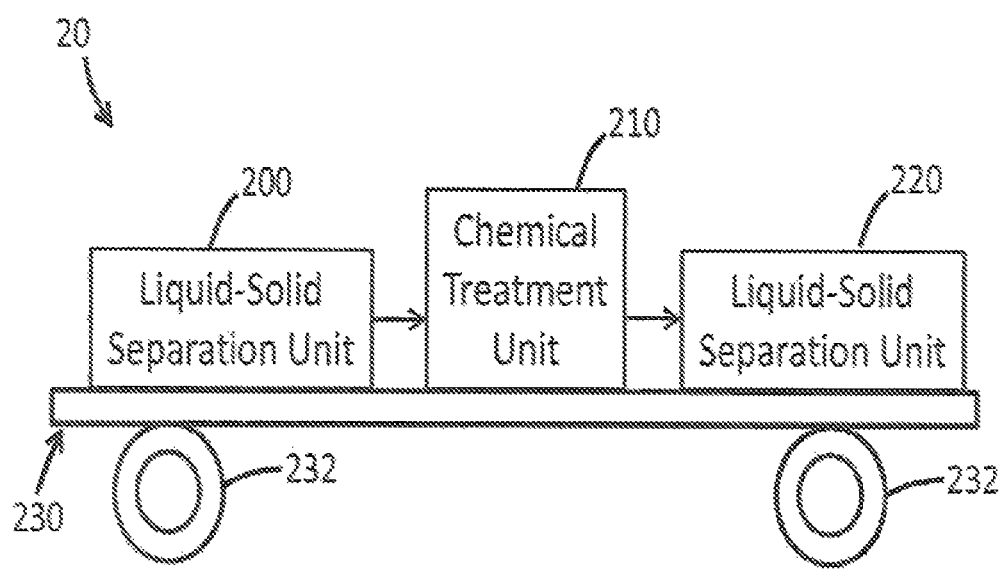
FIG. 4 shows one embodiment of the system for treating a high-P fluid as described below.

A system for treating a high-P fluid is shown generally at reference numeral 20 in FIG. 4. The system 20 includes an optional first liquid-solid separation unit 200, a chemical treatment unit 210, and a second liquid-solid separation unit 220. In some instances, the system 20 is a portable system. For example and for illustrative purposes only, the system 20 can include a trailer 230 with a plurality of wheels 232 such that the system can be transported from one location to another. This matters because there are numerous small 100-150 cow farms that could not afford a standalone system on their own. The portability of this system allows a consortium of farms or a service provider to use one system to serve the needs of approximately ten farms.

Figure 5:
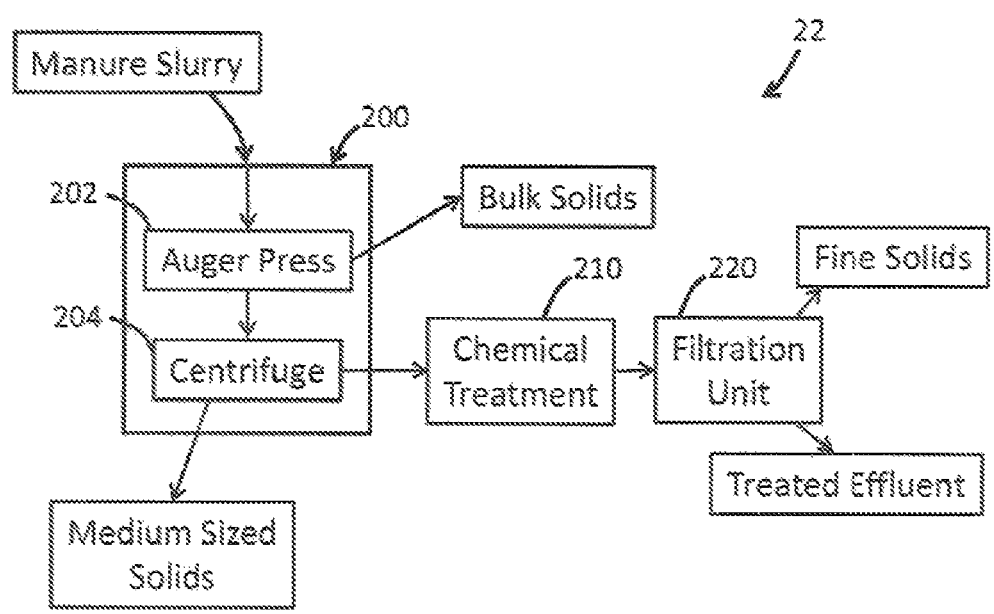
FIG. 5 shows another embodiment of the system for treating a high-P fluid as described below.

The system 20 can be further defined as shown in FIG. 5 in which a system 22 includes an auger press 202 and a centrifuge 204 as part of the optional first liquid-solid separation unit 200. The auger press 202 can provide or remove bulk solids from a high-P stream/slurry and the centrifuge can remove medium sized solids therefrom. Thereafter, the remaining stream passes through the chemical treatment unit 210 where a majority (e.g., equal to or greater than about 90%, preferably equal to or greater than about 95%) of P within the stream is transformed into a solid form, for example via sorption. Thereafter, this chemically treated stream is passed through a filtration unit 220 where fine solids are removed.

It is appreciated that the first liquid-solid separation unit 200 in systems 20 and 22 are optional. Stated differently, the system described herein includes treating a high-P fluid in the form of a slurry, stream, etc., that does not include bulk and medium size solids, but still removes P from the fluid via sorption (a physical and chemical process by which one substance becomes attached to another, either by adsorption or absorption).

"Optional" or "optionally" means that the subsequently described event or circumstance may or may not occur, and that the description includes instances in which said event or circumstance occurs and instances where it does not. For example, the phrase "the system and/or process can include an optional first liquid-solid separation step" means that the system and/or process may or may not include a first liquid-solid separation step and that this description includes processes and/or system that include and do not include a first liquid-solid separation step.

The term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 30%, preferably by as much as 20%, and more preferably by as much as 10%, to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

We sought to develop a treatment system for liquid manures that conserves or captures the manure nitrogen (N) content while removing most of the manure P content. Focusing upon dairy manure for initial testing of the system, our specific goals were to (1) remove sufficient P from dairy manure slurry to achieve an N:P ratio of at least about 8:1 (e.g., at least 8:1), and (2) concentrate the P into a solid, stackable form for transport off the farm. In addition, the prototype system would provide sizing parameters for building a full-scale system that could treat at least 38 $m^3$ $d^{-1}$ (equivalent to 26 l $min^{-1}$, or approximately 10 times the volume produced by a 100 cow dairy in one day) while being sufficiently compact and light to be mounted on trailers for transport to multiple small (100-150 cow) dairies. The sizing parameters are based on 24 h $day^{-1}$ operation.

Materials and Methods: Our approach was to design and evaluate components of sequential manure filtration systems, including liquid-solid separation, chemical treatment and supplemental stages. To do this, we first adapted the Louisiana system of Davis (2011) to include an initial, two-stage liquid-solid separation step (using the auger press and fiber filter, described below) because we intended the system to treat dairy slurries as opposed to clarified wastewaters. Then, we tested various alternative liquid-solid separation technologies in designing the final system configuration. A combination of adaptive field-scale and benchtop experiments was employed, conducting a mass balance of P and N in both manure liquids and solids during the filtration process.

The study was carried out in central Pennsylvania, part of the Chesapeake Bay Watershed and an area with intense focus on developing alternative treatment systems for manure (Kleinman et al., 2012). Manure from the dairy sector was estimated in 2010 to account for 20% of all manure phosphorus and 24% of all manure nitrogen in the Chesapeake Bay Watershed (Brosch, C., 2010, Estimates of county-level nitrogen and phosphorus data for use in modeling pollutant reduction—documentation for Scenario Builder version 2.2, In: ftp://ftp.chesapeakebay.net/modeling/P5Documentation/Scenario Builder Documentation—FINAL 9_16_2010.pdf (Accessed Sep. 22, 2014). The majority of dairy farms in the study area tended to be small (<100 head/farm), although an increasing number of larger operations (>1000 head/farm) can now be found. Manure storage is increasingly found on smaller dairy farms and is a constant feature on large operations. The liquid nature of most stored dairy manure reduces its potential for off-farm transport and therefore was the impetus for developing treatment options to manipulate manure solids and nutrients.

Liquid-Solid Separation Technologies. (a) Auger Press: The auger press tested (Manure Monster, Neptune Enterprises, Richland Center, Wis.) was selected because of its wide use in the dairy industry where it is effective at removing bulk solids from manure slurries, leaving dry stackable solids. The system tested in the current project was capable of maintaining a 47 l $min^{-1}$ flow rate. Commonly, solid rejects from this auger press are retained by dairies to be composted and dried, and ultimately recycled for bedding material.

(b) Fiber Filter: The fiber filter tested (Model FF-6, Vincent Corporation, Tampa, Fla.) is a screw press with a differential screw pitch that incorporates a flushing cycle for screen clearing. The fiber filter was selected for the current study because of its capability in removing fibrous medium sized particles (>42 μm diameter) and therefore potential as a secondary liquid-solid separation step following bulk solid removal. The fiber filter is typically used in vegetative and fruit juice industries and is capable of maintaining an 88 l $min^{-1}$ flow rate.

(c) Decanter Centrifuge: The decanter centrifuge tested (Bird 12×30, Andritz AG, Graz, Austria) is currently used for liquid-solid separation in a broad array of industrial applications (from manure management to mining). The decanter centrifuge was chosen for the current study due to its demonstrated ability to remove both bulk and medium sized particles (more than 25 μm diameter) from dairy manure while maintaining a 38 l $min^{-1}$ flow rate. This machine incorporates an internal auger to move solids to one end of the centrifuge bowl where they are discharged. Liquids flow out the other end of the bowl where they are discharged by gravity.

(d) Membrane Filter: The membrane filter tested (Model FMX-B, BKT Incorporated, Anaheim, Calif.) is capable of removing fine particles (0.02 μm-25 μm), and is designed to operate at a 44 l $min^{-1}$ flow rate. This type of filter has previously been shown to be effective at removing solids from anaerobically digested poultry manures as well as wastewater treatment. It features rapidly rotating circular filtration membranes to continually clear the filter pores.

(e) AutoVac®: The AutoVac® tested (Model AV220, ALAR Engineering Corporation, Mokena, Ill.) is a vacuum filtration system that uses a diatomaceous earth cake as a filter. The AutoVac® is currently used in a number of industrial applications to remove fine particles (0.5 μm-40 μm). The AutoVac® tested featured a vacuum pulled on a slowly rotating 0.61 m diameter by 0.61 m long drum with a surface area of 0.03 m in a shallow tank and was capable of maintaining a 9.5 l $min^{-1}$ flow rate. A diatomaceous earth slurry was introduced to the tank where it built up a layer of diatomaceous earth which served as a filter. Waste slurry was then pumped into the tank and liquids were drawn to the interior of the drum, leaving solids on the surface that were continually removed by a steel knife as the drum rotates, exposing a fresh filtration surface. Despite its slow rate of filtration, the AutoVac was selected for the current study due to its unique ability to remove plugged filter material, and its availability in a large range of configurations that could accommodate higher flow rates that the unit tested.

(f) Ancillary Components: Various ancillary components were also employed. These included (1) electrical trash pumps (7.62 cm for raw manures and 5.1 cm for all other liquids) to provide inputs to the major components of the system; (2) tanks (1.9 m$^3$) to contain effluents and for chemical treatment; (3) a 40 KW diesel generator; and, (4) hoses and valves (10.2 cm pinch valve to prevent plugging with raw manures, 5.1 cm ball valves for all other liquids) fitted to the major components for flow control; (5) two 7.6 by 2.4 m gooseneck trailers.

(g) Assembly of manure treatment system components: Prototype components for liquid-solid separation and chemical treatment steps were assembled and mounted on trailers at the USDA-ARS Pasture Systems and Watershed Management Research Unit watershed field station (Klingerstown, Pa.) and tested at either Pennsylvania State University's Larson Agronomy Farm (Pennsylvania Furnace, Pa.) or at the various dairy operations.

Manures Tested: Dairy manures were obtained from three operating farms. Due to the number of treatment technologies evaluated at various scales (from laboratory to field), testing was carried out over a nine-month period. In order to use fresh manure, it was not possible to evaluate all technologies with identical manure sources.

150-Cow Dairy: Manure slurry was obtained from a dairy farm with 150 lactating Holstein dairy cows (*Bos taurus*) housed in a free stall barn. Dairy manure was scraped daily into a holding pit and water was added once per week to the pit to transfer manure to a slurry holding tank. Manure from the open slurry holding tank was transferred to a 2,000 gallon recirculating tanker (on two dates) following approximately 24 h of agitation, which was then used as the source for testing the modified Louisiana system and for final field testing of the system.

2700-Cow Dairy: The largest dairy from which we used manures had approximately 2700 lactating Holstein dairy cows housed in free stall barns. Manure from the barns was scraped into a holding pit, where water was added, and was transferred continually to an open holding tank, where it was fed continually to screw press for liquid-solid separation. Manure from the holding tank was pumped directly into the system for testing. One major difference in this dairy's manure treatment compared to the other two dairies is that they amend their manure with lime for bacterial control, resulting in a manure slurry that was intended to have an elevated pH.

1500-Cow Dairy: Centrifuge effluents for chemical optimization tests were collected from a dairy with an operating centrifuge for liquid-solid separation. This dairy had 1500 lactating Holstein dairy cows housed in a free stall barn. Dairy manure was scraped into a holding pit, where water was added, and manure was transferred continually to a sand separator, with its effluents being fed to a decanter centrifuge capable of removing medium sized particles (>25 µm diameter) while maintaining a 154 l min$^{-1}$ flow rate (DeLaval, Tumba, Sweden).

Sample Collection/Preservation and Laboratory Analysis. Sample Collection and Preservation: Samples were taken of the raw dairy manure slurry, and of effluents and solid rejects from the liquid-solid separation steps to test for solids content and P and N concentrations (discussed below). Raw manure slurry samples were collected from a well-stirred tank or lagoon (44-1000 m$^3$), while effluent samples were collected from a well-stirred tank (essentially a large-scale churn splitter) that homogenized the entire production (0.88-1.32 m$^3$) of the previous step. Additionally, during the testing of the system, a large sample (88 l) was also collected of the chemically treated centrifuge effluent from each farm, and was sent to BKT, Inc. (Anaheim, Calif.) for testing in the membrane filter unit. Solid reject samples were collected from a well-mixed bin that contained the entire production from the previous step. All samples were stored at 4° C. until analyzed or used in laboratory-scale testing.

Total P Determination: Samples were subjected to total P and Ca (Aqua Regia digest), water extractable P (WEP), and total N (Kjeldahl digest) analysis. Briefly, for total P and total Ca, manure slurries and solids were extracted with aqua regia following a modified EPA Standard Method 3050B (Kimbrough, D. E., and J. R. Wakakua, Env. Sci. and Tech., 23: 898 (1989). Solids were oven dried at 110° C. for 16 h to determine solids content and then digested wet, such that the sample size contained 0.5 g of solid material. These samples were then digested with 5 ml aqua regia (25% HNO$_3$, 75% HCl) at 95° C. for 1.5 h, and then 2.5 ml H$_2$O$_2$ was added and the samples were digested for an additional 30 min at 95° C. The final effluents from the AutoVac® and membrane filter were treated as water samples. Briefly, 10 ml of sample was digested for 1.5 h at 95° C. with 2.5 ml aqua regia, and then 2.5 ml H$_2$O$_2$ was added and the samples were digested for an additional 30 min at 95° C. Following dilution to final volumes and filtration (Whatman 1), P analysis was then performed on all extracts using an inductively coupled optical emission spectrophotometer (ICP-OES, Varian).

Water Extractable P Determination: Water extractable P was determined by the method of Kleinman et al. (Kleinman, P., et al., J. Env. Qual., 36: 1357-1367 (2007)). Briefly, based on the solids content, sufficient sample of manure slurries to contain 2.0 g solids was shaken with enough distilled water to make a final weight of 202 g on an end over end shaker at 15 rpm for 1 h. The final effluent from the AutoVac) was treated as a water sample. Samples were centrifuged (34,000 g$_0$) and filtered (0.45 µm), and analysis was then performed on all extracts using an inductively coupled optical emission spectrophotometer (ICP-OES, Varian).

Total N Determination: Samples were also extracted by Kjeldahl digest for total N determination (Gallaher, R. N., et al., Soil Sci. Soc. Am. J., 40: 887-889 (1976); Peters, J. (editor), Recommended Methods of Manure Analysis, Bulletin A3769, University of Wisconsin Extension, Madison, Wis., Cooperative Extension Publishing, 2003). Briefly, an amount of sample equivalent to 0.5 g solids material was weighed into digestion tubes, 3.5 g K$_2$SO$_4$, 0.4 g CuSO$_4$, and 7 ml of concentrated sulfuric acid were added. The sample was then digested at 375° C. for 2 h. Following dilution to final volumes and filtration (Whatman 1), N analysis was then performed by Quick Chem Method 10-107-06-2-H (Lachat Instruments, Determination of total Kjeldahl nitrogen by Flow Injection Analysis, Quick Chem Method 10-107-06-2-H, Loveland, Colo., 2003).

Data Analysis: Nutrient removal efficiencies were determined from a mass balance approach comparing influent loads with observed loads in effluent liquids and solid rejects at each step of the manure treatment process.

Results and Discussion. We first evaluated the potential to adapt the Louisiana System proposed by Davis (2011) to achieve our P removal, N conservation, and flow requirement goals with liquid dairy manures. When the modified Louisiana System surprisingly failed to precipitate P (which we found was due to the high solids content of commercial dairy slurries), we designed a new system based upon sorption chemistry rather than precipitation of P by Ca$(OH)_2$.

Figure 6:
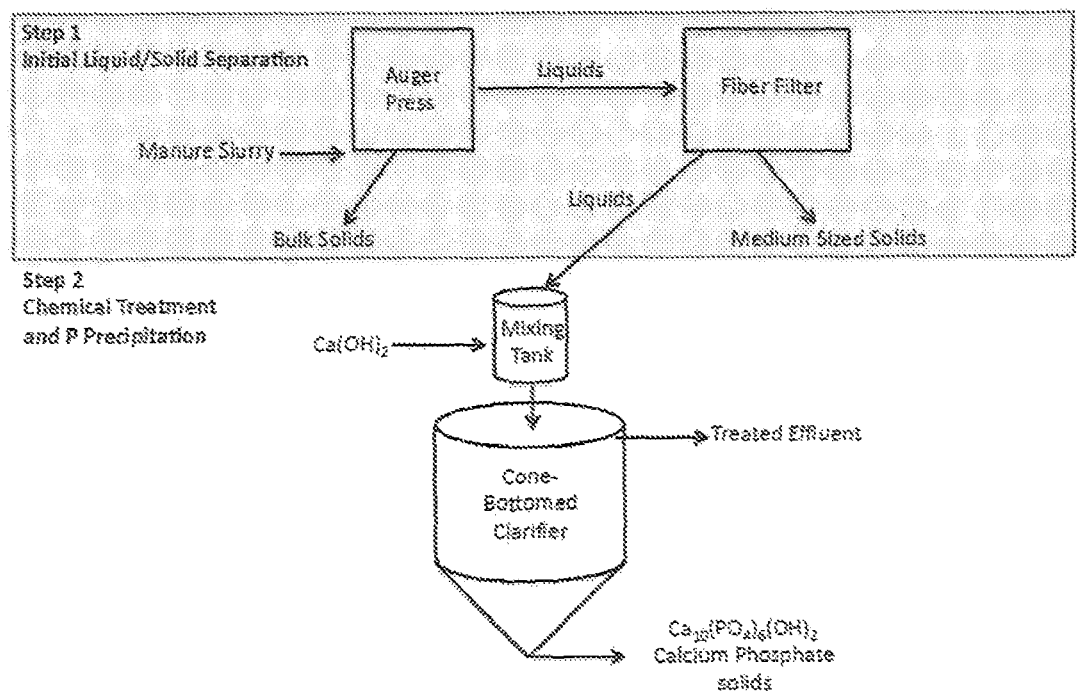
FIG. 6 shows conceptual flow chart of a Modified Louisiana manure filtration system (Davis, T., Development of a Total Nutrient Treatment System for Alligator and Dairy Parlor Wastewater Using Hydrated Lime and Organic Bacterial Growth Media, Miss. thesis, Baton Rouge, La., Louisiana State University, Department of Biological and Agricultural Engineering, 2011) as described below.

Development and Testing of An Improved Louisiana Prototype Treatment System: Our conceptual design of a modified Louisiana System consisted of (1) an initial, two-stage liquid-solid separation step; and (2) chemical treatment with $Ca(OH)_2$ (FIG. 6). We chose to build out the components of the liquid-solid separation step and test the chemical treatment in the laboratory to determine amounts of $Ca(OH)_2$ needed and particulate settling velocities, which would be critical in designing the cone-bottomed clarifier.

(a) Design and testing of Liquid-Solid Separation: The initial liquid-solid separation was designed to be carried out in two stages, removing the bulk solids from dairy manure with an auger press, and then removing the medium sized particles with a fiber filter. This sequence of solids separation was intended to remove bulk solids with the auger press, leaving behind a source of material that could be used as bedding. Alternatively, the bulk solids from the auger press could be combined with the fiber filter solids and possibly sold as fertilizer after composting.

The combination of auger press and fiber filter was readily adapted to fit on one 7.6 by 2.4 m gooseneck trailer along with ancillary pumps and electrical generator. While both the auger press and the fiber filter were effective in removing P from the raw dairy manure (Table 1), surprisingly only the auger press produced a solids reject that could serve as a stackable solid and would have potential to serve as bedding or to be removed from the farm. The solids from the auger press comprised approximately one tenth of the total volume of raw manure and had a solids content of 33%. Compared with the solids from the fiber filter, solids from the auger press surprisingly contained relatively low concentrations of P (468-699 mg kg$^{-1}$). In contrast, the reject solids from the fiber filter were of the consistency of applesauce, with a solids content of roughly 10%, comprising approximately one third of the total volume of influent from the auger press. Since one of our goals was to design a system that could treat at least 38 m$^3$ manure d$^{-1}$, the fiber filter would leave more than 14 m$^3$ of slurry that would be problematic to further de-water to put it into a compact compostable or transportable form.

(b) Design and Testing of the Chemical Treatment: After the initial liquid-solid separation step designed above, effluents from the fiber filter were to be subjected to chemical treatment by $Ca(OH)_2$ to coagulate the remaining particles and to transform dissolved P (primarily orthophosphate) into a solid calcium phosphate form. It was anticipated that the calcium phosphate would be periodically removed from the bottom of the tank, dried, and stored for use as a high-value phosphorus fertilizer.

The Louisiana System reported by Davis (2011) delivered 21 g of industrial grade hydrated lime (mixed in a lime/water slurry) per liter of clarified dairy parlor wastewater. We tested various concentrations (5-420 g l$^{-1}$) of $Ca(OH)_2$ amendment in the laboratory in order to appropriately design the cone-bottomed clarifier. Due to the high solids content of the filtrate after the liquid-solids separation step (Table 1), treatment with $Ca(OH)_2$ failed to precipitate solids and P by gravity alone. Rather, the particles formed flocculates that remained in suspension for at least 40 days, at which time they were discarded. We also tested treatment of the fiber filter effluent with $Al_2(SO_4)_3$ in various concentrations (5-420 g l$^{-1}$). The results of this testing similarly failed, producing a suspended gel that would not separate into liquid and solid phases. Further testing suggested that failure of $Ca(OH)_2$ and $Al_2(SO_4)_3$ treatments was due to both the size and quantity of particles retained in the fiber filter effluent. Indeed, bench-top filtration of the fiber filter effluent to remove particles >30 µm surprisingly resulted in successful precipitation by both chemical treatments. Given these failures, we concluded that a completely new design, using different liquid-solid separation mechanisms while testing different P removal chemistries would be necessary to accomplish all the goals of the project.

Figure 7:
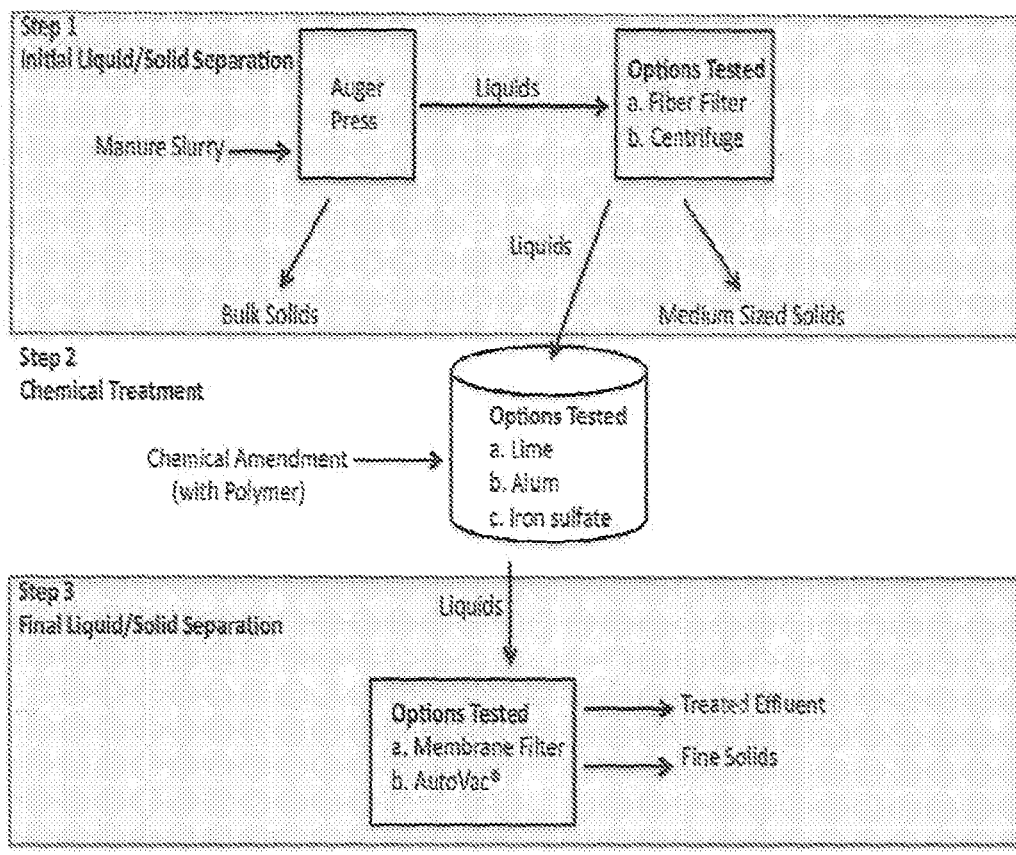
FIG. 7 shows flow chart showing options tested in designing the system as described below.

Development and Testing of the System: Following the failure of the Modified Louisiana System during testing, we explored a number of options to design our system, which consisted of (1) an initial two-stage liquid-solid separation step; (2) chemical treatment; and (3) a final liquid-solid separation step (FIG. 7).

(a) Development of the Initial Liquid-Solid Separation: As in the Modified Louisiana System, the initial liquid-solid separation of the system was designed to occur in two stages: the first to remove the bulk solids; the second to remove intermediate solids (>25-40 µm). Since the auger press used in the Modified Louisiana System worked well to perform bulk solids removal, it was retained as the first stage for both options tested. However, we investigated two second-stage liquid-solid separation options to prepare the manure effluent for further treatment: (a) the fiber filter used in the modified Louisiana system and (b) the decanter centrifuge.

(b) Chemical Treatment: Three options for chemical treatment were tested to coagulate the particles and to transform dissolved P (primarily orthophosphate) into a solid form prior to the final liquid solid-separation step. Liquid effluents from each of the liquid-solid separation options evaluated above were subjected to batch experiments to select an optimal chemical treatment. For all batch experiments, a small amount (0.21 g l$^{-1}$) of an anionic polymer (Praestol® 2504 from Ashland Deutschland GmbH, Krefeld, Germany) was added for coagulation. In separate tests, ferric sulfate, aluminum sulfate and calcium hydroxide were added at various rates (2.0-10 g l$^{-1}$), with the intent to convert P from solution to solid phase. While surprisingly as much as a 700:1 ratio of N:P (much higher than our goal) was achievable at the higher rates tested, optimal values (and chemicals used) were determined based upon flow through a benchtop AutoVac® unit, cost of amendments, and potential toxicity issues to plants, without regard to P removal efficiencies. Fiber filter effluent for optimization tests came from our testing of the Modified Louisiana System (above), while centrifuge effluents for optimization tests were collected from the 1500-Cow Dairy, since it had an operating centrifuge for liquid-solid separation.

(c) Final Liquid-Solid Separation: For the final liquid-solid separation we tested a membrane filter which removed particles larger than 0.02 µm (BKT, Anaheim, Calif.), and a vacuum filtration system that uses a diatomaceous earth filter (AutoVac, ALAR Engineering Corporation, Mokena, Ill.), with the objective of removing remaining fine solids (>0.25 µm diameter) along with sorbed P from the chemical treatment step.

Design of the system. (a) Initial Liquid-Solid Separation: We chose to use two stages for the initial liquid-solid separation step so that the bulk solids, which are low in P relative to the other two solids generated by the system, could be left behind on the farm to be composted and used as bedding material. For farms that do not use the compost for bedding, the bulk solids could be blended with the other solids from the system and sold as fertilizer after composting. Alternatively, the auger press could be eliminated from the system for those farms that would not utilize the bulk solids, so long as the remaining component was sized sufficiently to handle the added solids content while still removing solids >30 μm.

Due to its satisfactory performance, the auger press used in the Modified Louisiana System was retained as a first stage of the initial liquid-solid separation. For the second stage of the liquid solid separation step, the fiber filter was not retained because of the anticipated difficulty in dewatering the solids reject, and because, as tested, it did not remove all particles >30 μm. Changing filter screens could have solved the latter problem, but would have produced an even greater quantity of reject. Instead, we chose to use a decanter centrifuge after collecting and testing solids and effluent from a dairy farm with an operating centrifuge. These solids were of a stackable consistency (approximately 30% solids), and the effluent was subjected to further chemical optimization tests.

(b) Chemical Optimization: Chemical optimization for ease of flow through a benchtop AutoVac® unit was performed as indicated above on the effluents from the centrifuge samples collected from the operating dairy farm in conjunction with experts from Alar Engineering and samples were obtained for total P and total N analyses. The findings showed nearly equal results for $Al_2(SO_4)_3$ and $Fe_2(SO_4)_3$ in regards to both flow through the benchtop AutoVac®, total P, and total N, with N:P ratios as high as 700:1. We chose to use 3.0 g $l^{-1}$ $Fe_2(SO_4)_3$ in the system however, so as to mitigate potential effects of aluminum toxicity to plants in the final solids.

(c) Final Liquid-Solid Separation: We had two potential choices for the final liquid-solid separation step, a membrane filter, and an AutoVac) unit. Initial tests of the membrane filter had indicated a promising N:P ratio of 20:1 even without chemical treatment, so a large sample of ferric sulfate treated centrifuge effluent from both farms used in the system testing was sent to them for further testing. While the membrane filter was able to lower the total P to below 11 mg $l^{-1}$ and to give N:P ratios of 433:1 and 130:1 for the two farms, respectively, the physical nature of the solids reject had an even higher water content than the fiber filter, and would surprisingly leave approximately one third of the total volume treated difficult to dewater. Therefore, the AutoVac® was chosen for the final liquid-solid separation step.

Figure 8:
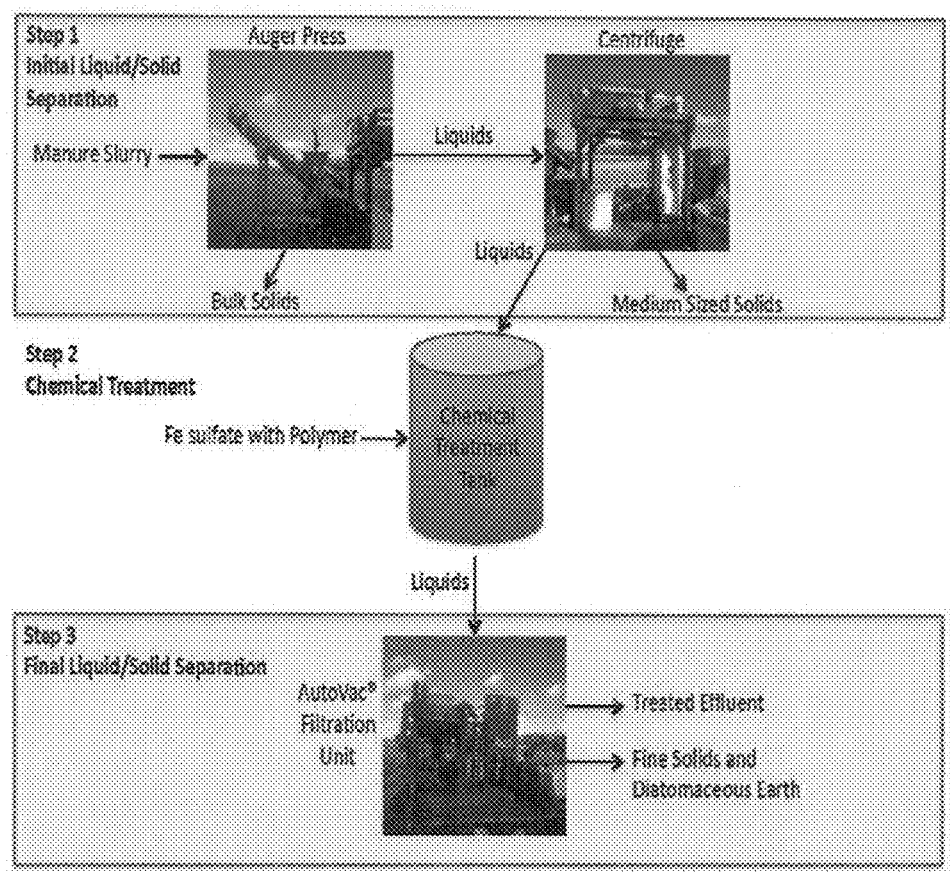
FIG. 8 shows one system, showing two-stage, liquid-solid separation step, chemical treatment, and final liquid-solid separation steps as described below.

Testing and Performance of the system: Following the evaluation of options for the filtration and chemical treatment steps, we identified the most suitable components for the system (FIG. 8). A complete prototype of the final system was constructed on two 7.62 by 2.4 m gooseneck trailers that could be towed behind a IT truck. The system was then tested on manures from two commercial dairy farms, one was a 150 cow dairy operation and the other a 2700 cow dairy. As noted, one major difference in how these dairies handled their manures was that the larger dairy added $Ca(OH)_2$ at several stages of their manure handling to inhibit bacterial growth, whereas the smaller dairy did not.

Overall results showed that the pilot scale system was able to filter 17.6 l $min^{-1}$ of fresh dairy manure at the smaller dairy and 6.6 l $min^{-1}$ at the larger dairy, with the difference likely being attributed to the $Ca(OH)_2$ addition by the larger dairy. This difference in flow observed can likely be attributed to the Ca(OH) addition by the larger dairy. As mentioned, this manure was intended to have an elevated pH but in practice did not (pH=7.64 as compared 7.67 in the non-amended manure). Total Ca in the amended manure was considerably higher, however (6467 mg $l^{-1}$ as compared to 1470 mg $l^{-1}$). This additional Ca likely formed very small precipitates with P and other constituents in the manure that partially plugged the diatomaceous earth filter in the AutoVac®, resulting in the lower flow rate. Therefore, in practice, dairy manure management will likely be a critical parameter when upscaling the system design.

In terms of P and solids removal, testing on the two farms surprisingly showed a 98% removal of water extractable P from the two manures, and a 96 and 99% removal of Aqua Regia Extractable P from the 150- and 2700-cow dairy manures respectively, with all P-rich solids being dry and stackable, suitable for blending and composting (Table 2). Furthermore, with total N values in the final effluent being 357.9 mg $kg^{-1}$ and 385.8 mg $kg^{-1}$ for the 150- and 2700-cow dairy respectively, the N:P ratios achieved were 19:1 and 65:1.

Alternative Options Tested: In an attempt to reduce costs of operation, we also tested alternatives in both the configuration of the system, and in the chemistry used for treatment.

Four-Machine Configuration: As an alternative to the single-stage final liquid-solid separation step, we tested using the membrane filter and the AutoVac® unit together in a two-stage configuration. In this configuration, centrifuge effluents would be treated chemically and then serve as influents to the membrane filter. The slurry-like reject from the membrane filter (roughly 33% of the total volume) would then be fed to the AutoVac® unit, while the effluent from the membrane filter would have a relatively low P concentration with an acceptable N:P ratio. It was anticipated that this might reduce costs since only 33% of the total volume would need to be treated by the AutoVac®, eliminating the need for a larger unit, as well as reducing the daily operating costs of the diatomaceous earth used for the filter.

As anticipated, the results of testing the four-machine configuration showed that the effluent of the membrane filter was relatively low in P (76.2 mg $kg^{-1}$) and had an acceptable N:P ratio of 20:1. However, the slurry-like reject from the membrane filter surprisingly required 1:1 dilution by water before it could be effectively filtered by the AutoVac®. Therefore, this configuration is not likely viable due to the need for our projected system to be mobile, but might be an option if it were built as a stand-alone system.

Acid Mine Drainage Residual (AMDR) substitution for $Fe_2(SO_4)_3$: Acid mine drainage residual was obtained from Hedin Environmental (Pittsburgh, Pa.) and is a material derived from the environmental remediation of abandoned coal mine drainage. Impaired mine water is diverted into shallow ponds, where it is allowed to oxidize and the water either drains or evaporates. The residual left behind is a fine-grained yellowish-brown cake composed primarily of mixed iron oxides. Once dried, this cake was finely ground and used directly as a substitute for $Fe_2(SO_4)_3$ in the chemical treatment tank (3.0 g $l^{-1}$). In lieu of batch treatment in the chemical treatment tank, we also tried incorporating iron oxide into the diatomaceous earth pack (567 g) of the AutoVac® unit to promote P sorption as filtrate passed through the diatomaceous earth pack. The latter option, if effective, would also simplify the system somewhat, through the elimination of the chemical treatment tank.

Figure 9:
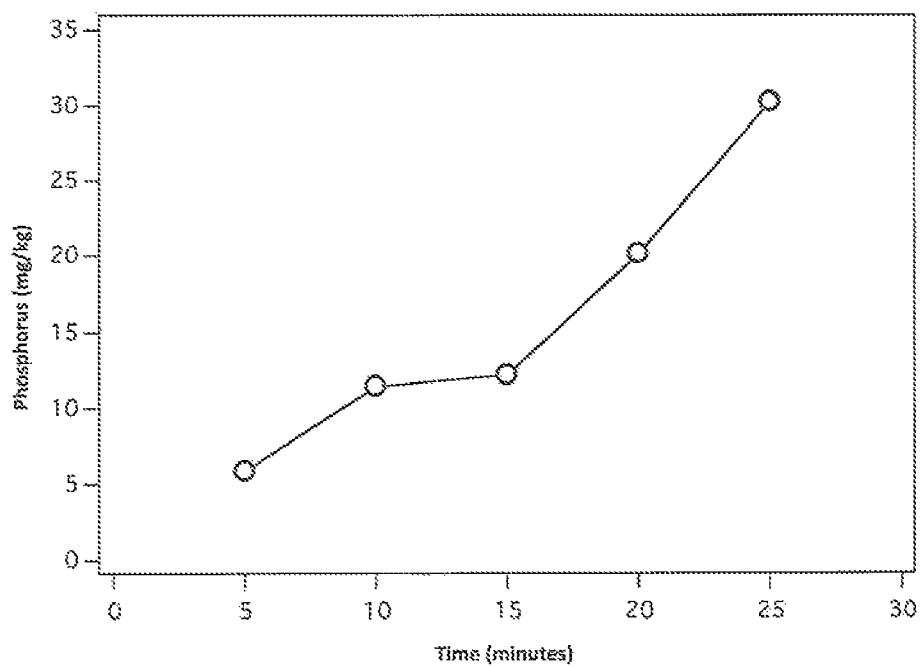
FIG. 9 shows phosphorus in effluent of AutoVac® when Acid Mine Drainage Residual (AMDR) was incorporated into the filter pack as described below.

The results of substituting the AMDR for $Fe_2(SO_4)_3$ in the chemical treatment tank showed that it was nearly as effective at removing P, with a final effluent concentration of 21.6 mg kg$^{-1}$ compared to 18.4 mg kg$^{-1}$, with an N:P ratio of 232:1, and would likely serve to reduce the costs of treatment. However, the results of mixing the AMDR into the diatomaceous earth filter pack were surprisingly not as promising (FIG. 9). While P removal was good early in the experiment, resulting in an even lower effluent P concentration compared to the final effluent concentration gained by mixing the same amount (based on treating 189 kg of centrifuge effluent) of AMDR with the centrifuge effluent in the chemical treatment tank, the P removal efficiency rapidly and continually declined, likely due to rapid filling of sorption sites. Therefore, this method of chemical treatment is not likely to be viable.

Conclusions: Our two tests indicated that in terms of flow, the prototype system built was able to process manure at 66% of the target rate of 38 m$^3$ day$^{-1}$ (26.4 l min$^{-1}$) at the small dairy and 25% of the target rate at the large dairy. However, even with the lower flow rate, the system tested could easily be scaled up to handle 38 m$^3$ day$^{-1}$ (26.4 l min$^{-1}$) and still be a mobile system. This would require only increasing the size of the AutoVac® tested since the auger press and decanter centrifuge were capable of 47 and 38 l min$^{-1}$ flow rates, respectively. Incorporating a larger AutoVac® would still result in a system of sufficiently small size to fit on two 7.6 by 2.4 m gooseneck trailers and could service the needs of ten 100-cow dairies, or alternatively, could be operated as a stand-alone system to handle the needs of a 1,000-cow dairy if operated on a 24 h basis. The system could be scaled even larger, but a system larger than one capable of 82 m$^3$ day$^{-1}$ (which could handle the needs of 21 100-cow dairies or one 2100-cow dairy) would likely not be mobile.

Estimated capital cost of a mobile full-scale system capable of treating 38 m$^3$ day$^{-1}$ at the lower flow rate observed is $291,000. This capital cost includes (1) auger press ($35,000); (2) decanter centrifuge ($100,000); (3) AutoVac® Model AV360 ($100,000); (4) 40 KW diesel generator ($35,000); (5) two gooseneck trailers ($13,000); (6) electrical trash pumps ($5,000); (7) chemical treatment tanks ($2000); and (8) ancillary hoses, valves, and fittings ($1000). The daily estimated operating cost of such a system is $750. This operating cost includes (1) diatomaceous earth and chemicals used for treatment ($550); (2) diesel used for electrical generation ($50); and (3) labor ($150).

Several considerations are noted. Undoubtedly variation in manure handling (particularly with respect to added amendments such as Ca(OH)$_2$) and storage will influence the performance of the system. Furthermore, our objective was to conserve the manure N in the final effluent, which would then have value as a fertilizer source or N-rich liquid manure that would be land applied. However, additional steps to remove the N may be preferred, particularly given the potential to volatilize NH$_3$ from the treated effluent.

Two subsequent tests demonstrate the optional configuration of the system in cases where the initial or first liquid-solid separation step is not needed. These tests were performed on acid whey from a yogurt manufacturing facility, and on clarified manure liquor from a dairy manure settling lagoon.

In the first test, ferric sulfate (Fe$_2$(SO$_4$)$_3$) was added directly to acid whey, and without being bound by theory, the Fe$_2$(SO$_4$)$_3$ reacted with the acid whey to precipitate out iron oxide/oxyhydroxide particles while P ions within the stream sorbed onto the iron oxide/oxyhydroxide precipitates during the precipitation process. Also, the iron oxide/oxyhydroxide served as sorption sites for P ions to attach to after the precipitation process and thereby served to transform dissolved P into a solid form. Results of the test illustrated that a system would be able to handle 18 gallons per hour of flow of acid whey per square foot of filter area. Since there are commercially available filtration units with as large as 503 square feet of filtration surface (e.g., AutoVac units manufactured by ALAR Engineering Corporation, Mokena, Ill.), the test indicated that as much as 9000 gallons per hour of acid whey could be treated. While it is possible that such a system could be portable and be located on multiple trailers, trucks, etc., and thus transported from one facility to another, it is likely that such a large system would be designed to be operated in place. In terms of phosphorus removal, a 90% removal of phosphorus from the acid whey was surprisingly achieved, with all phosphorus-rich solids being dry and stackable and thus ready to be blended and/or composted, or sold directly as an animal feed additive.

In the second test, ferric sulfate (Fe$_2$(SO$_4$)$_3$) was added directly to clarified manure liquor from a dairy manure settling lagoon, and without being bound by theory, the Fe$_2$(SO$_4$)$_3$ reacted with the manure liquor to precipitate out iron oxide/oxyhydroxide particles while P ions within the stream sorbed onto the iron oxide/oxyhydroxide precipitates during the precipitation process. Also, the iron oxide/oxyhydroxide served as sorption sites for P ions to attach to after the precipitation process and thereby served to transform dissolved P into a solid form. Results of the test illustrated that a system would be able to handle 37 gallons per hour of flow of manure liquor per square foot of filter area. Since there are commercially available filtration units with as large as 503 square feet of filtration surface (e.g., AutoVac units manufactured by ALAR Engineering Corporation, Mokena, Ill.), the test indicated that as much as 18,000 gallons per hour of this manure liquor could be treated. While it is possible that such a system could be portable and be located on multiple trailers, trucks, etc., and thus transported from one facility to another, it is likely that such a large system would be designed to be operated in place. In terms of phosphorus removal, a 97% removal of phosphorus from the manure liquor was surprisingly achieved, with all phosphorus-rich solids being dry and stackable and thus ready to be blended and/or composted.

The auger press, centrifuge, phosphorus treating chemicals, and filtration unit can be any known to those skilled in the art. For example, and for illustrative purposes only, the pilot scale filtration unit 220 was an AutoVac unit manufactured by ALAR Engineering Corporation in Mokena, Ill.

All of the references cited herein, including U.S. patents, are incorporated by reference in their entirety. Also incorporated by reference in their entirety are the following: U.S. Pat. No. 6,893,567; U.S. Pat. No. 7,674,379 B2.

Thus, in view of the above, there is described (in part) the following:

A process for treating high-P fluid comprising chemically treating said high-P stream such that a majority of dissolved P in said stream is transformed into a solid form via sorption of P onto particles placed or precipitated within said stream; and removing the solid form containing P from the chemically treated fine solids stream, such that >about 90% of the total P is removed from the high-P fluid. The above process, further comprising providing a high-P containing stream. The above process, further comprising removing solids equal to or greater than 30 micrometers in diameter from said stream and producing a fine solids stream. The above process. wherein removal of the solids equal to or greater than 30 micrometers in diameter includes removal of bulk solids and removal of particles having the diameter equal to or greater than 30 micrometers. The above process, wherein said bulk solids are removed with an auger press. The above process, further including composting said bulk solids. The above process, further including blending said bulk solids with the solid form containing P to produce fertilizer. The above process, wherein said particles having the diameter equal to or greater than 30 micrometers are removed with a centrifuge.

The above process, wherein said fine solids stream is chemically treated with at least one member selected from the group consisting of iron sulfate, iron chloride, iron oxyhydroxide, aluminum sulfate, aluminum chlorhydrate, calcium oxide, calcium or hydroxide (lime), and mixtures thereof. The above process, wherein said fine solids stream is chemically treated using a batch process. The above process, wherein said fine solids stream is chemically treated using a continuous process. The above process, wherein the chemically treating includes coagulating the fine solids. The above process, wherein said coagulating includes adding a polymer coagulate to the fine solids stream.

A system for treating a high-P stream, said system comprising a chemical treatment station operable to chemically treat and transform equal to or greater than about 90% of dissolved P in a high-P stream into a solid form; and a liquid-solid separator station operable to remove the solid form containing P from said chemically treated high-P stream.

The above system, further comprising another liquid-solid separator station operable to remove solids equal to or greater than 30 micrometers in diameter from said high-P stream and produce a fine solid stream before said chemical treatment station. The above system, wherein said another liquid-solid separator station is operable to remove bulk solids and particles having a diameter equal to or greater than 30 micrometers from said high-P stream. The above system, wherein said another liquid-solid separator station has an auger press, said auger press operable to remove said bulk solids. The above system, wherein said another liquid-solid separator station has a centrifuge, said centrifuge operable to remove said particles having said diameter equal to or greater than 30 micrometers.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

P removal within the liquid-solid separations step of the Modified Louisiana System.

| Manure/Effluent (150-cow dairy) | Solids (%) | Aqua Regia Extractable P (mg kg$^{-1}$) | Aqua Regia Extractable P Removed (mass basis, %) |
| --- | --- | --- | --- |
| Raw Manure | 7.4 | 402.1 | 0 |
| Auger Press Effluent | 5.7 | 415.7 | 14 |
| Fiber Filter Effluent | 4.6 | 365.5 | 28 |

TABLE 2

P removal in effluent of steps/stages of our system.

| | Solids (%) | Water Extractable P (mg kg$^{-1}$) | Aqua Regia Extractable P (mg kg$^{-1}$) | Aqua Regia Extractable P Removed (mass basis, %) |
| --- | --- | --- | --- | --- |
| Manure/Effluent (150 cow dairy) | | | | |
| Raw Manure | 7.5 | 171.5 | 482.2 | 0 |
| Auger Press Effluent | 5.8 | 126.7 | 494.8 | 14 |
| Centrifuge Effluent | 3.8 | 64.8 | 277.3 | 46 |
| AutoVac ® Effluent | 0.6 | 3.2* | 18.4 | 36 |
| Manure/Effluent (2700 cow dairy) | | | | |
| Raw Manure | 7.9 | 185.4 | 435.7 | 0 |
| Auger Press Effluent | 7.6 | 187.8 | 430.1 | 15 |
| Centrifuge Effluent | 4.0 | 130.5 | 317.5 | 44 |
| AutoVac ® Effluent | 0.5 | 4.6* | 5.9 | 40 |

*Total Dissolved P: 0.45 μm membrane filter.

We claim:
1. A process for treating high-phosphorus containing fluid, said method comprising:
    (a) providing a high-phosphorus containing fluid wherein said fluid contains dissolved phosphorus and water;
    (b) removing any bulk solids in said high-phosphorus containing fluid that are greater than or equal to 30 μm in diameter if said high-phosphorus containing fluid contains bulk solids greater than or equal to 30 μm in diameter;
    (c) chemically treating said high-phosphorus containing fluid with iron sulfate and optionally at least one chemical selected from the group consisting of iron chloride, iron oxyhydroxide, aluminum sulfate, aluminum chlorhydrate, calcium oxide, calcium hydroxide, and mixtures thereof such that a majority of dissolved phosphorus in said high-phosphorus containing fluid is transformed into a solid form via sorption of phosphorus onto particles formed from the reaction of said chemical with said water or via sorption of phosphorus onto any solids equal to or greater than 1 μm within said high-phosphorus containing fluid; and
    (d) removing said solid form and any other solids equal to or greater than 1 μm from said high-phosphorus containing fluid, such that ≥about 90% of the total phosphorus is removed from said high-phosphorus containing fluid; wherein said process does not involve the removal of nitrogen from said high-phosphorus containing fluid as a first step and said process does not involve a bioreactor; wherein the nitrogen:phosphorus ratio of said high-phosphorus containing fluid after step (d) is at least about 8:1.
2. The process of claim 1, wherein said bulk solids are removed with an auger press.
3. The process of claim 1, further including composting said bulk solids.
4. The process of claim 1, further including blending said bulk solids with said solid form to produce fertilizer.
5. The process of claim 1, wherein said bulk solids are removed with a centrifuge.
6. The process of claim 1, wherein said high-phosphorus containing fluid is chemically treated using a batch process.

7. The process of claim 1, wherein said high-phosphorus containing fluid is chemically treated using a continuous process.

8. The process of claim 1, wherein said chemically treating includes coagulating said solid form.

9. The process of claim 8, wherein said coagulating includes adding a polymer coagulate to said solid form.

10. The process of claim 1, said process comprising (b) removing any bulk solids in said high-phosphorus containing fluid that are greater than or equal to 25 μm in diameter if said high-phosphorus containing fluid contains bulk solids greater than or equal to 25 μm in diameter.

11. The process of claim 1, wherein the pH of said process is circumneutral.

12. The process of claim 1, wherein said high-phosphorus containing fluid in (a) contains solids.

13. The process of claim 1, wherein said high-phosphorus containing fluid in (a) contains animal manure.

14. The process of claim 1, wherein said high-phosphorus containing fluid in (a) contains acid whey from a yogurt manufacturing facility.

15. The process of claim 1, wherein the nitrogen:phosphorus ratio of said high-phosphorus containing fluid after step (d) is at least 19:1.

16. The process of claim 1, said process comprising (c) chemically treating said high-phosphorus containing fluid with iron sulfate and at least one chemical selected from the group consisting of iron chloride, iron oxyhydroxide, aluminum sulfate, aluminum chlorhydrate, calcium oxide, calcium hydroxide, and mixtures thereof.

17. The process of claim 1, said process comprising (d) removing said solid form and any other solids equal to or greater than 1 μm from said high-phosphorus containing fluid, such that ≥about 95% of the total phosphorus is removed from said high-phosphorus containing fluid.

18. The process of claim 1, said process comprising (d) removing said solid form and any other solids equal to or greater than 1 μm from said high-phosphorus containing fluid, such that 97% of the total phosphorus is removed from said high-phosphorus containing fluid.

19. A process for treating high-phosphorus containing fluid, said method comprising:
(a) providing a high-phosphorus containing fluid wherein said fluid contains dissolved phosphorus and water;
(b) removing any bulk solids in said high-phosphorus containing fluid that are greater than or equal to 30 μm in diameter if said high-phosphorus containing fluid contains bulk solids greater than or equal to 30 μm in diameter;
(c) chemically treating said high-phosphorus containing fluid with iron sulfate and at least one chemical selected from the group consisting of iron chloride, iron oxyhydroxide, aluminum sulfate, aluminum chlorhydrate, calcium oxide, calcium hydroxide, and mixtures thereof such that a majority of dissolved phosphorus in said high-phosphorus containing fluid is transformed into a solid form via sorption of phosphorus onto particles formed from the reaction of said chemical with said water or via sorption of phosphorus onto any solids equal to or greater than 1 μm within said high-phosphorus containing fluid; and
(d) removing said solid form and any other solids equal to or greater than 1 μm from said high-phosphorus containing fluid, such that ≥about 90% of the total phosphorus is removed from said high-phosphorus containing fluid; wherein said process does not involve the removal of nitrogen from said high-phosphorus containing fluid as a first step and said process does not involve a bioreactor; wherein the nitrogen:phosphorus ratio of said high-phosphorus containing fluid after step (d) is about 8:1.

20. A process for treating high-phosphorus containing fluid, said method consisting of:
(a) providing a high-phosphorus containing fluid wherein said fluid contains dissolved phosphorus and water;
(b) removing any bulk solids in said high-phosphorus containing fluid that are greater than or equal to 30 μm in diameter if said high-phosphorus containing fluid contains bulk solids greater than or equal to 30 μm in diameter;
(c) chemically treating said high-phosphorus containing fluid with iron sulfate and optionally at least one chemical selected from the group consisting of iron chloride, iron oxyhydroxide, aluminum sulfate, aluminum chlorhydrate, calcium oxide, calcium hydroxide, and mixtures thereof such that a majority of dissolved phosphorus in said high-phosphorus containing fluid is transformed into a solid form via sorption of phosphorus onto particles formed from the reaction of said chemical with said water or via sorption of phosphorus onto any solids equal to or greater than 1 μm within said high-phosphorus containing fluid; and
(d) removing said solid form and any other solids equal to or greater than 1 μm from said high-phosphorus containing fluid, such that ≥about 90% of the total phosphorus is removed from said high-phosphorus containing fluid; wherein said process does not involve the removal of nitrogen from said high-phosphorus containing fluid as a first step and said process does not involve a bioreactor; wherein the nitrogen:phosphorus ratio of said high-phosphorus containing fluid after step (d) is about 8:1.

* * * * *